United States Patent

[11] 3,624,021

[72] Inventor Andrew M. Barba
 Conklin, N.Y.
[21] Appl. No. 469,914
[22] Filed July 6, 1965
[45] Patented Nov. 30, 1971
[73] Assignee GAF Corporation
 New York, N.Y.
 Continuation-in-part of application Ser. No. 48,575, Aug. 10, 1960, now abandoned. This application July 6, 1965, Ser. No. 469,914

[54] POWDERED GLASS FOR USE IN DRAFTING SURFACES AND IN A DIAZO TYPE MATERIALS
 3 Claims, No Drawings

[52] U.S. Cl. ............................................. 260/32.8 N, 260/33.2, 260/395 B, 96/75, 117/138.8, 117/76, 117/145, 117/155, 260/851
[51] Int. Cl. ........................................... C08c 11/28, C08c 11/32
[50] Field of Search .......................... 96/75, 91; 117/138.8 A, 138.8 N, 138.8 E, 138.8 U, 169, 76, 76 F, 76 P, 80, 145, 155; 260/851, 39, 39 SB, 32.8 N, 33.2

[56] References Cited
UNITED STATES PATENTS

| 3,148,064 | 9/1964 | Rauner et al. | 96/115 X |
| 2,914,404 | 11/1959 | Faneslan et al. | 96/75 X |
| 2,718,476 | 9/1955 | Eichorn | 96/91 X |
| 2,784,089 | 3/1957 | Frederick | 96/91 |
| 2,801,919 | 8/1957 | Eichorn | 96/75 X |
| 2,831,783 | 4/1958 | Swiss et al. | 117/138.8 |
| 2,964,423 | 12/1960 | Van Stappen | 117/76 |
| 2,999,016 | 9/1961 | Beeber et al. | 96/75 |
| 3,100,722 | 8/1963 | Herrmann et al. | 117/138.8 |

*Primary Examiner*—George F. Lesmes
*Assistant Examiner*—R. E. Martin
*Attorneys*—Walter C. Kehm, George L. Tone and Samson B. Leavitt

ABSTRACT: Sheet material, useful for drafting, and diazo-type materials, having dispersed therein glass powder in a particle size range of 1 to 20 microns.

3,624,021

POWDERED GLASS FOR USE IN DRAFTING SURFACES AND IN A DIAZO-TYPE MATERIALS

The present invention relates to the use of powdered glass as an ingredient in precoats to be applied to base materials suitable for drafting applications, including paper, film and clot, to provide matte surfaces with good tooth and erasure properties, and to the sensitization of such precoats with light-sensitive diazo compounds to produce diazo-type materials capable of producing prints having good smoothness characteristics and excellent tooth and erasure properties. It also contemplates the formation of such light-sensitive diazo-type materials by coating paper, film or cloth with a sensitizing solution in which the glass powder is included as a component.

Some of the properties which a paper, film or cloth suitable for use in drafting should possess are as follows:

1. good pencil and ink receptivity;
2. visual transparency, controllable from a dense to a highly transparent matte;
3. manual or mechanical erasure of pencil lines with minimum "ghosting" of the removed line, glossing of the matte surface, or degradation of the coating, and
4. good transparency to the near ultraviolet to permit rapid diazo or other reproduction.

The commercially available matte surfaces for drafting applications lack one or more of these prerequisites. Some of the pigments heretofore used in making such drafting surfaces were aluminum and other metallic oxides, silicates, or stearates, silica, rice starch, or diatomaceous earth. However, with the use of these pigments there was a tendency to one or more of the following deficiencies:

1. leave "ghost" images upon mechanical or manual erasure of pencil lines;
2. cause either of glossing or whitening of the surface upon erasure;
3. yellow with age or on repeated exposures to light;
4. absorb substantially in the near ultraviolet requiring extended exposure time in making copies on diazo-type or other light-sensitive materials.

It has now been found that powdered glass of high purity with a relative absence of metallic ions and in a particular size range may be used as a pigment and toothing agent in resin coatings on film, cloth or paper to be used for drafting applications with the following superior results:

1. excellent pencil tooth and line density with good smoothness;
2. excellent erasure properties exemplified by;
   a. absence of "ghosting of erased lines,
   b. resistance to glossing of the surface on multiple erasures;
   c. resistance to whitening of the surface on multiple erasures: d. resistance to degradation of the surface on multiple erasures, and e. excellent rewrite characteristics in erased areas.
3. high transmission of near-ultraviolet light to permit rapid diazo-type or other copies to be made, and
4. excellent initial whiteness and whiteness retention on aging.

Sources of powdered glass of exceptionally high purity, cleanliness and whiteness with a relative absence of metallic ions or other contaminants are available; however, powdered glass as commercially available is generally to coarse in particle size to give the optimum desired results so one of the known methods of particle size reduction usually must be applied to the powdered glass pigment before use, e.g., ball milling or hammer milling. In this invention, the glass powder particles are in the size range of about 1–20 microns, preferably about 3–10 microns.

When a material of minus 100 mesh grade is obtained for use in this invention, a ball milling period of 20 to 24 hours of a 30 percent slurry of powdered glass in water gives optimum properties for use in precoats for drafting applications. Ball milling periods of 24 to 72 hours give powdered glass of a particle size distribution that is more satisfactory for coatings on paper or cloth. The time of milling is chosen to give the desired balance between smoothness of surface and tooth properties: increased smoothness results from finer particle size and longer milling times, while increased tooth is obtained with coarser sizes and shorter milling times.

The base to which the powdered glass is applied may be whiteprint paper, transparentized paper, 100 percent rag paper or the like. If the film is used, resort may be had to any film base used in photography, such as cellulose triacetate, nylon, cellulose acetate-propionate cellulose acetate-butyrate, polyethylene terephthalate, polystyrene, polycarbonate or the like. As a cloth base, polyester-filled glass cloth, polyester-filled cotton cloth, or any cloth employed in the preparation of drafting materials may be used.

When using whiteprint paper as the base, it is possible to lay down the powdered glass as a precoat without resort to a resin as a binder. However, for best results, it is recommended that in the preparation of drafting materials a resin binder be employed, the binder being any resin which is sufficiently flexible to permit handling without crazing, To this end, cellulose esters such as cellulose acetate or polymers derived from compounds containing the grouping

may be employed. These polyvinyl compounds may be homopolymers such as polyvinyl acetate, polystyrene or copolymers such as those of vinyl chloride and vinyl acetate 86 86 percent of chloride to 14 percent of acetate), terpolymers of vinyl chloride, vinyl acetate and vinyl alcohol (9 percent of chloride, 3 percent of acetate and 6 percent of alcohol), polyvinyl butyral, terpolymers of vinyl butyral, vinyl alcohol, and vinyl acetate (84.5 percent of butyral, 13 percent of alcohol and 2.5 percent of acetate), copolymers of vinyl acetate with crotonic acid, polyacrylic acid, polymethacrylic acid, copolymers of methacrylic acid and acrylic acid and the like.

In the event that an inert-surfaced film base, such as polystyrene, polyethylene terephthalate or the like is employed, it is preferably to mix the resin binder with a reactive formaldehyde resin derived from condensing formaldehyde with urea, a diazine, such as 2,4,6-triaminopyrimidine 2-mercapto-4,6-diaminopyrimidine, or related compounds described in U.S. Pat. No. 2,211,710 or with a triazine such as melamine, cyanurtrihydrazide, trimethylolmelamine and related compounds described in U.S. Pat. Nos. 2,487,569 and 2,197,357, and partially polymerize the resulting condensation product to the stage where the polymer still remains reactive and incompletely cured.

Examples of reactive formaldehyde condensation products are alcohol condensates of urea and formaldehyde (50 percent solids in equal parts of xylene and butanol), alcohol condensates of melamine with formaldehyde (60 percent solids in equal parts of xylene and butanol), urea formaldehyde condensation products (60 percent solids in equal parts of ethanol and butanol), urea formaldehyde condensation products (60 percent solids in a mixture of seven parts of butanol to one part of xylene) and urea formaldehyde condensation products (50 percent solids in a mixture of three parts of butanol to two parts of xylene).

After application of the mixture of the resin and the ground glass to the inert-surfaced base, curing of the formaldehyde resin is effected during the drying cycle of the coated mixture. To facilitate the complete curing of this resin, an acid catalyst should be used, and, for this purpose, there may be employed stannic chloride, aluminum sulfate, methyl or ethyl phosphoric acid, salicyclic acid, sulfosalicylic acid, ammonium chloride, anhydrous aluminum chloride or the like. In fact, any of the latent or slow-acting acidic catalysts recommended for use in the curing of urea formaldehyde resins are suitable.

The coating composition may be formed in any solvent for the flexible resin, and, for this purpose, I have found that excellent results are obtained when using 2-methoxy ethanol, methyl isobutyl ketone or the like.

If the urea formaldehyde resin is used, curing may be effected at a temperature ranging from 270°–300° F. for a time ranging up to about 10 minutes. It appears that in the curing stage a reaction takes place between the formaldehyde resin and the flexible resin by which a very strong bond is achieved between the coating and the surface of the inert base.

Other pigments such as silica, alumina or titanium dioxide may be used along with the powdered glass to improve "whiteness" of the precoated base.

If it is intended to use the precoated paper, film or cloth base for the formation of light-sensitive diazo-type materials, the precoated base may be sensitized with a composition containing a light-sensitive diazo compound and a coupling component. The composition may contain the usual adjuncts such as thiourea, and an acid to prohibit precoupling, such as citric acid or the like. Any of the usual diazo and coupling components may be employed in the coating composition. Suitable diazo compounds are N,N-diethylaminobenzenediazonium chlorozincate, p-morpholinobenzenediazonium fluoborate, the diazo compounds described in U.S. Pat. Nos. 2,542,716, 2,422,061 and the like. Suitable couplers are 2,3-dihydroxynaphthalene, resorcinol, m,m-ethylenedioxydiphenol and the couplers described in U.S. Pat. Nos. 2,494,906, 2,542,566, 2,560,137 and the like. It is to be emphasized at this point that the particular diazo and coupler employed are not critical to the invention.

Diazo-type materials may also be produced by coating paper, film or cloth which may or may not be precoated with powdered glass with a sensitizing solution containing the powdered glass as a component thereof. In a diazo-type materials it is preferable to have the glass powder in the 1–20 micron range. In this case, the flexible resin may be used in the coating solution or may be dispensed with. In either case, the advantages previously enumerated are obtained.

It has been previously noted that pigments have been employed either as a precoat or in the sensitizing solution in the preparation of diazo-type materials. Specifically, reference may be made to the use of silica and alumina. It is to be stressed, however, that it is not possible when using these pigments alone to obtain the results inherent in the use of powdered glass of the particle size described. The use of the powdered glass is, therefore, the critical feature of this invention.

The invention is further illustrated by the following examples, but it is to be understood that the invention is not limited to the examples.

EXAMPLE I

A coating composition containing:

| | |
|---|---|
| 2-Methoxy ethanol (MC solvent) | 26 l. |
| Vinyl acetate-crotonic acid copolymer | 4500 g. |
| Urea formaldehyde resin syrup | 6750 g. |
| Ground glass (milled 48 hours to make 12,500 cc. slurry) | 3750 g. |
| Stannic chloride in 1500 cc. MC solvent | 270 g. | was applied to a film of polyethylene terephthalate, dried and cured at 300° F. for 2 minutes.

The surface thus produced had exceptionally good pencil-receptive properties, high smoothness, excellent erasure properties, no "ghosting" or glossing characteristics and high visual transparency and sheen.

EXAMPLE II

A film of polyethylene terephthalate was coated with the following composition:

| | |
|---|---|
| MC solvent | 26 l. |
| Vinyl acetate-crotonic acid copolymer | 4500 g. |
| Urea formaldehyde resin syrup | 6750 g. |
| Ground glass (milled 36 hrs. in MC solvent | 2250 g. |
| Silica gel powder (milled 36 hrs. in MC solvent) | 1500 g. |
| Titanium dioxide pigment (milled 36 hrs. MC solvent) | 75 g. |
| Stannic chloride in 750 cc. of MC solvent | 270 g. |

The coating was dried and cured as above.

This coating produced a smooth pencil-receptive surface, very little surface sheen, moderate matte effect and whiteness, excellent erasure properties, moderate visual transparency and no "ghosting" or glossing.

EXAMPLE III

A film of polyethylene terephtalate was coated with the following composition:

| | |
|---|---|
| MC solvent | 35 l. |
| Vinyl acetate-crotonic acid copolymer | 5400 g. |
| Urea formaldehyde resin syrup | 8100 g. |
| Ground glass (milled 36 hrs.) | 2700 g. |
| Silica gel powder (milled 36 hrs.) | 1800 g. |
| Titanium dioxide (milled 36 hrs.) | 270 g. |
| Stannic chloride in 1000 grams of MC solvent | 324 g. |

The coating was dried and cured as in Example I.

This coating produced a smooth pencil-receptive surface very little surface sheen, high matte effect and whiteness, low visual transparency and good erasure properties with no "ghosting" or glossing.

EXAMPLE IV

Another coating composition which can be used in the same manner as in example I–III is as follows:

| | |
|---|---|
| MC solvent | 200 cc. |
| Vinyl acetate-crotonic acid copolymer | 600 g. |
| Urea formaldehyde resin syrup | 900 g. |
| Ground glass (milled 72 hrs.) | 1500 g. |
| Stannic chloride in 300 grams of MC solvent | 50 g. |

This composition produced a coating with a high matte effect, excellent smoothness and whiteness and moderate visual transparency. It can also be used as a rear projection screen material.

EXAMPLE V

The following formulation was coated on transparentized paper, doctored, and dried:

| | |
|---|---|
| Methyl isobutyl ketone | 85 cc. |
| 2-methoxy methanol | 15 cc. |
| Vinyl chloride-acetate resin | 15 g. |
| Powdered glass (1 to 20 microns) | 4 g. |

The resulting coating was smooth to the touch and displayed highly improved pencil receptive and erasure properties over the carrier base with an insignificant increase in adsorption in the near ultraviolet permitting rapid diazo or other reproductions to be made.

EXAMPLE VI

The formulation in example V was applied to a prime-coated starch-filled cloth. The resulting coating was smooth to the touch and displayed superior pencil-receptive and erasure properties with an insignificant increase in adsorption in the near ultraviolet permitting rapid diazo or other reproductions to be made.

EXAMPLE VII

The following formulation was coated on transparentized paper, doctored, and dried:

| | |
|---|---|
| Water | 75 cc. |
| Ethylene glycol | 3 cc. |
| Boric acid | 0.5 g. |
| Citric acid | 3 g. |
| Thiourea | 3 g. |
| Zinc chloride | 3 g. |
| Resorcinol | 2 g. |
| Diethylaminobenzenediazonium chlorozincate | 4 g. |
| Powdered glass (1 to 20 microns) | 4 g. |

| | |
|---|---|
| Blue tint dye | 0.02 g. |
| Saponin | 0.2 g. |
| Water to make | 100 cc. |

Prints made of this coating displayed good dye and surface smoothness, density improvement and no tendency for the pigment to crock or pick off the surface. Surface feel was smooth to the touch without the clammy feel associated with the presence of other pigments, e.g., silica gel, that were similarly coated without a binder resin.

EXAMPLE VIII

The following formulation was coated on cellulose acetate base, doctored and dried:

| | |
|---|---|
| 2-methoxyethanol | 75 cc. |
| Methanol | 15 cc. |
| Cellulose acetate resin | 3 g. |
| Powdered glass (1 to 20 microns) | 3 g. |

This coating displayed excellent pencil tooth and erasure properties, far superior to a mechanically abraded base, and permitted several corrections and additions in the same area while retaining pencil line density on each addition with no trace of "ghosting" of erased lines.

EXAMPLE IX

The following formulation was applied to 10 lb. whiteprint paper, doctored and dried:

| | |
|---|---|
| Water | 92.5 cc. |
| Vinyl acetate emulsion (60%) | 7.5 cc. |
| Powdered glass (1 to 20 microns) | 10 g. |

This precoat was then coated with the following formulation, doctored and dried:

| | |
|---|---|
| Powdered glass (1 to 20 microns) | 4 g. |
| Water | 60 cc. |
| Ethylene glycol | 3 cc. |
| Isopropanol | 1 cc. |
| Citric acid | 4 cc. |
| Zinc chloride | 5 g. |
| Thiourea | 5 g. |

| | |
|---|---|
| 2,3-dihydroxynaphthalene | 4 g. |
| p-diethylaminobenzenediazonium chlorozincate | 2 g. |
| Saponin | 0.1 g. |
| Water to make | 100 cc. |

The resulting blue line print made from this coating displayed good smoothness of dye and smoothness to the touch with no tendency of the pigment to crock or pick of the surface. Print yellowing is substantially improved with this pigment over similar particle-sized silica gels.

EXAMPLE X

The following formulation was applied to the subject coating of example I and dried:

| | |
|---|---|
| Acetone | 60 cc. |
| 2-methoxy ethanol | 30 cc. |
| Formic acid | 10 cc. |
| Sulfosalicyclic acid | 2.5 g. |
| Citric acid | 2.0 g. |
| Aluminum sulfate | 2.0 g. |
| m,m'-ethylenedioxydiphenol | 4 g. |
| p-morpholinobenzenediazonium fluoborate | 3 g. |

A print made of this material displayed high smoothness of dye line, high reprint speed, excellent tooth and erasure properties with no glossing or "ghosting" after several erasures and good tooth in previously erased areas. Visual, as well as actinic, light transmission is very high.

Modifications may be resorted to within the scope of the ordinary skill in the art.

We claim:

1. A coating composition comprising a vinyl acetate-crotonic acid copolymer, urea formaldehyde resin and glass power of 1–20 microns.

2. A coating composition as defined in claim 1 in which the copolymer and the resin syrup are dissolved in a solvent selected from the class consisting of 2-methoxy-ethanol and methyl-isobutyl ketone.

3. A coating composition comprising a vinyl acetate-crotonic acid copolymer, urea formaldehyde resin and glass powder of 1–20 microns, silica gel and titanium dioxide.

* * * * *